United States Patent
Gordon et al.

(10) Patent No.: US 11,656,886 B1
(45) Date of Patent: May 23, 2023

(54) SCREEN READER LANGUAGE SWITCHING FOR USER INTERFACE

(71) Applicant: Freedom Scientific, Inc., Clearwater, FL (US)

(72) Inventors: Glen Gordon, Madison, WI (US); Sriram M. Ramanathan, Safety Harbor, FL (US); Matt Ater, Manassas, VA (US); John Palenchar, Dunedin, FL (US); Prafuldev Raveendran, Kerala (IN); Vimal P. Sojan, Thrissur (IN)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

(21) Appl. No.: 17/877,950

(22) Filed: Jul. 31, 2022

(51) Int. Cl.
| | |
|---|---|
| *G06F 9/451* | (2018.01) |
| *G06F 3/0484* | (2022.01) |
| *G10L 13/08* | (2013.01) |
| *G06F 3/0488* | (2022.01) |

(Continued)

(52) U.S. Cl.
CPC ............ *G06F 9/454* (2018.02); *G06F 3/0482* (2013.01); *G06F 3/0484* (2013.01); *G06F 3/0488* (2013.01); *G06F 3/167* (2013.01); *G10L 13/08* (2013.01)

(58) Field of Classification Search
CPC ...... G06F 9/454; G06F 3/0482; G06F 3/0484; G06F 3/0488; G06F 3/167; G10I 13/08; G10L 13/08
See application file for complete search history.

(56) References Cited

U.S. PATENT DOCUMENTS

| 8,468,445 B2 * | 6/2013 | Gupta | G06F 16/80 |
| | | | 715/255 |
| 2008/0195482 A1 * | 8/2008 | Sailer | G06F 40/58 |
| | | | 705/14.14 |

(Continued)

OTHER PUBLICATIONS

AccessibilityServiceInfo reference, taken from https://developer.android.com/reference/android/accessibilityservice/AccessibilityServiceInfo, published Apr. 2019, 61 pages (Year: 2019).*

(Continued)

*Primary Examiner* — William L Bashore
*Assistant Examiner* — Gregory A Distefano
(74) *Attorney, Agent, or Firm* — Anton J. Hopen; Smith & Hopen, P.A.

(57) ABSTRACT

Accessibility for vision impaired users is improved with a novel screen reader system. A user interface control of a first application that switches a language applied to text displayed on the first application is identified to a second application. The second application stores an identifier for the user interface control and a value representative of the language selected by the user interface control to a data structure. The second application then listens for user control events occurring on the first application such as focus, click and selection events. When the second application detects the user interface control switching languages the second application changes the default screen reader language to the language of the visual text of the first application. Thus, the text-to-speech output of the visual text is read with the correct speech inflection and pronunciation of the selected language.

15 Claims, 7 Drawing Sheets

(51) Int. Cl.
*G06F 3/16* (2006.01)
*G06F 3/0482* (2013.01)

(56) References Cited

U.S. PATENT DOCUMENTS

| | | | | |
|---|---|---|---|---|
| 2010/0231752 A1* | 9/2010 | Lodge | ............... | G09B 21/001 704/260 |
| 2011/0246175 A1* | 10/2011 | Yi | ........................ | G06F 40/45 704/3 |
| 2011/0261030 A1* | 10/2011 | Bullock | ............ | G06F 3/0488 345/204 |
| 2012/0113019 A1* | 5/2012 | Anderson | ............ | G06F 1/1643 345/173 |
| 2014/0100844 A1* | 4/2014 | Stieglitz | ............... | G06F 40/45 704/7 |
| 2016/0156774 A1* | 6/2016 | Campbell | ......... | H04M 1/72403 455/418 |
| 2017/0269816 A1* | 9/2017 | Bradley | ............... | G06F 40/14 |
| 2019/0138598 A1* | 5/2019 | Albouyeh | ............ | G09B 21/006 |
| 2019/0317763 A1* | 10/2019 | Sakamoto | ............ | A63F 13/79 |

OTHER PUBLICATIONS

"Google launches screen reader and translation tools for Android phones", taken from Google launches screen reader and translation tools for Android phones—CNET, by Richard Nieva, published Mar. 4, 2020, 2 pages (Year: 2020).*

* cited by examiner

SCREEN READER LANGUAGE SWITCHING FOR USER INTERFACE

BACKGROUND OF THE INVENTION

The described embodiments relate generally to accessibility software for low-vision users of computing devices. More specifically, the described embodiments pertain to a method of setting a screen reader language by listening to a user-interface control event.

Switching languages in a user interface is part of software localization. Localization is the modification of a software interface and messages to another language. This may also include changing certain formats such as measures, dates and currency. With respect to a screen reader application, localization is needed to correctly pronounce text on the screen. When the text on the screen is localized to Spanish but the screen reader is localized to English the pronunciations are incorrect and the resultant user experience suffers.

For example, consider a screen reader used by kiosks running on the ANDROID® operating system (OS). A characteristic of a kiosk is that it runs a single application or a limited set of applications in a loop. A kiosk application running on an Android OS with English as its system language can support multiple languages. A canonical example is a food ordering kiosk with both an English user interface (UI) and a Spanish UI in the same application. Or in Canada, most kiosk apps support French and English. The UI language is typically switched with a button or switcher UI control on the kiosk application screen.

In Android, the screen reader operates as an accessibility service. An accessibility service operates outside the space of the mobile application. It registers a set of event listeners (focus change, text change, etc.) with the operating system. It then is notified with appropriate data of any change in the foreground mobile application. The screen reader processes the notifications according to its rules and needs, synthesizes text that needs to be spoken and sends it to a speech synthesizer. As part of the output to the speech synthesizer, the screen reader must select the right voice appropriate for the language so that it can speak it with the correct inflection/pronunciation.

In web applications and websites, text inside controls can be marked up using the language (lang) tag. Operating systems including ANDROID®, pass the language information to the screen reader so that it can switch voices automatically. However, many web developers and their resultant solutions do not employ the lang tag and thus the screen reader does not transition over to the appropriate voice/language.

Many native application controls and widgets do not have the facility to annotate the language. While the native widgets have a text property, and it is Unicode, they do not have a lang property. The language is often inferred from the system's default language. This does not work well with applications that have to be multilingual simultaneously or can switch languages dynamically. The user is generally expected to go to the screen reader settings and change the language manually. However, the screen reader settings are hidden from the user in a kiosk world and otherwise would require unnecessary user input.

Thus, what is needed is a method and system to switch the voice language of a screen reader application in conjunction with switch of the application language so that the screen reader outputs the application language with the correct pronunciation.

SUMMARY OF THE INVENTION

An embodiment of the invention includes a method for setting a screen reader language by monitoring callback events relating to a language switching control on a third-party application running on the same operating system. An implementation of the method includes the steps of providing a configuration module adapted to monitor user action events executed on a user interface, the user interface containing a control that changes the language of displayed text in the user interface. This control may be a button, toggle switch, dropdown selection, list box selection, radio button group, checkbox group, tree control or spinner control. Responsive to a predefined user-implemented event on the user interface in conjunction with the control, the configuration module displays a context menu to set a language action to reconcile the default screen reader language with the language of displayed text in the user interface. The language action is stored in a data structure to map the language action to the control. The data structure may be a key-value pair type, hashmap, or the like to associate the control with the language selection value. User control events are monitored in the user interface. The events are selected from the group consisting of focus events, click events and selected events. Responsive to receiving a callback for the user control events, the method compares the callback against the data structure and changes the default screen reader language responsive to the control changing the language of displayed text in the user interface.

Embodiments of the invention may monitor accessibility event callbacks through an accessibility service such as that provided on the ANDROID® operating system. The callbacks may include ANDROID® specific events such as TYPE_VIEW_ACCESSIBILITY_FOCUSED, TYPE_VIEW_CLICKED and TYPE_VIEW_SELECTED. While examples enumerated herein are provided in the context of a certain operating system the method is applicable to others such as those under the brand MICROSOFT WINDOWS. Furthermore, applications running on kiosks have unique constraints but this invention may be applied to any computing system wherein a user interface control changes languages without otherwise setting the screen reader voice to match the selected language.

The invention implemented as a system to set the active language of a screen reader application includes a number of features. These features include providing the screen reader loadable into memory of an operating system running on a computing device, the operating system concurrently running an application having a graphic user interface displaying text in a first language. For example, the screen reader may be one known under the brand name JAWS® and the application a native application running on the operating system. Alternatively, the application may be web-based wherein the content author failed to properly localize the web application with lang tag and therefore the screen reader does not know to switch over to a different voice/language.

The application has a graphic user interface (GUI) which displays text in a first language. A control presented on the GUI switches text displayed on the graphic user interface from the first language to a second language. A configuration module in the system identifies the control on the GUI that effectuates the language switch. While the displayed language may be switched, the screen reader language has not. Therefore, without the invention, the screen reader would output text-to-speech in the voice of the first language even though the text itself is in the second language. Accordingly, the inflection and pronunciation of the screen reader voice is dissonate with the language it is reading aloud.

To prevent this problem, the configuration module stores both an identifier for the control and a value for the second language in a data store. Now the system is prepared to correlate the setting of the application's language and also the proper screen reader language. To do this, a listener module in the screen reader is coupled to the application through the operating system. This means it is listening for event callbacks associated with the control on the GUI that switch from one language to another. The listener module intercepts a plurality of events from the application. These include focus events, click events and select events. The listener module receives a collection of event data in the callback.

Finally, a query module in the screen reader compares the collection of event data against the data store. Responsive to the collection of event data matching the identifier for the control and the value for the second language, the screen reader sets the active language of the screen reader application to the second language. Embodiments of the invention anticipate the control on the GUI invokable through a touch screen interface and marking the particular control as switching languages is performed by a predefined gesture operable on the control. Marking the control brings up a context menu that includes controls to assign one of a plurality of languages supported by the screen reader to the language switching control. The configuration module that identified the control may create a key using a combination of a package name, class name, resource name and text of the control and stores the key in a hashmap with a language identifier as a corresponding value.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
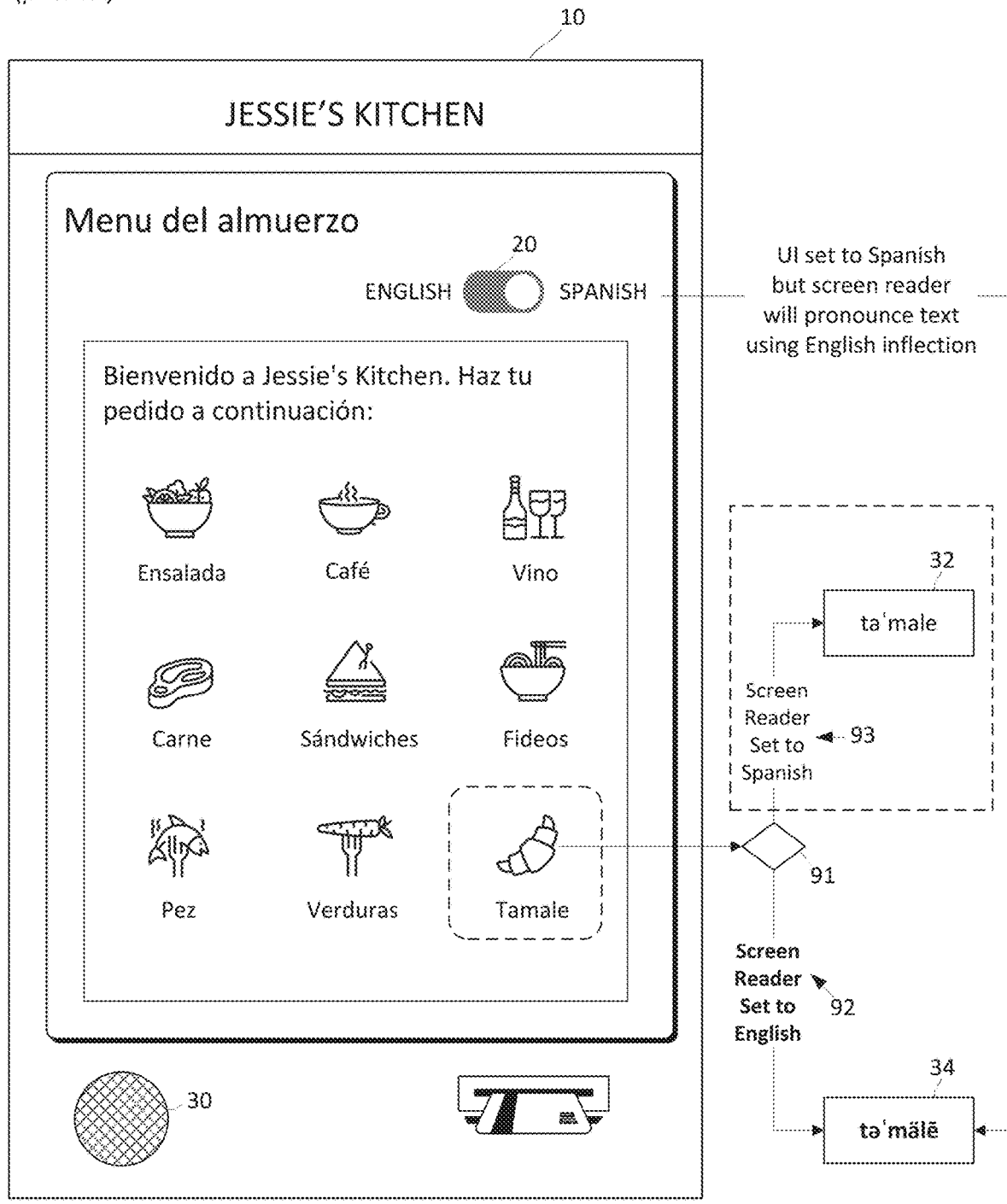
FIG. 1 is a combination of user interface and diagrammatic flow showing a deficiency in the prior art.

Turning now to FIG. 1, kiosk 10 for a restaurant provides a self-ordering system for patrons. In this example, toggle switch 20 switches languages between English and Spanish. The graphic user interface (GUI) of the kiosk 10 is localized to Spanish in FIG. 1 but the screen reader is set to English. Accordingly, when the patron selects "Tamale" from the GUI menu the default screen reader language setting 91 is set to English 92 instead of properly set to Spanish 93. Accordingly, the "Tamale" selection is output by audio speaker 30 through screen reader with an incorrect pronunciation 34.

Figure 2:
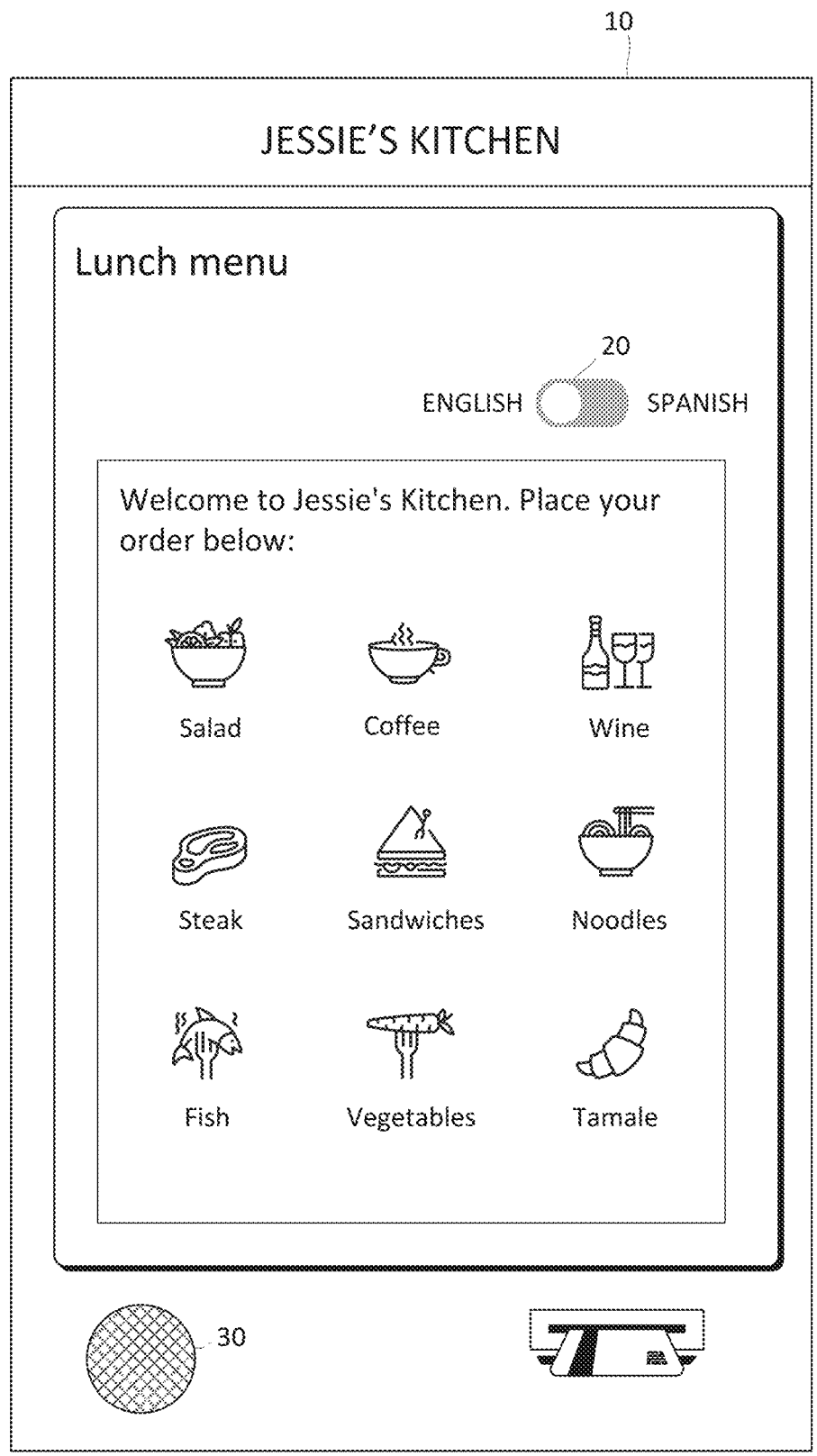
FIG. 2 shows a user interface of a menu kiosk set to the English language by a toggle switch control.
Figure 3:
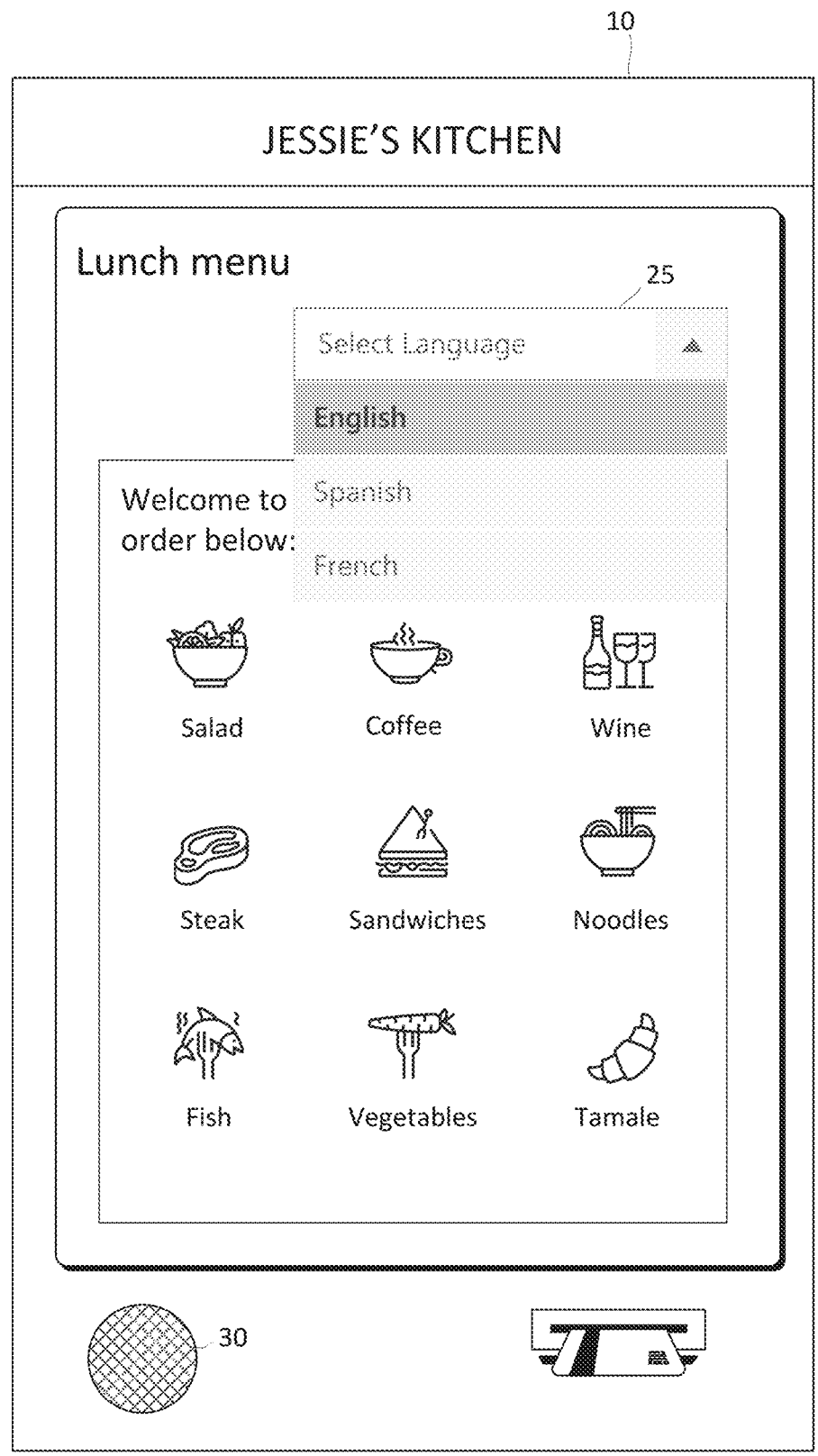
FIG. 3 shows the user interface of a menu kiosk set to the English language via a dropdown list box control.

FIG. 2 is shown with toggle switch 20 set to English and the resultant GUI text is localized to the English language. However, if the screen reader is set to Spanish then it will output the GUI shown English text with Spanish inflection and pronunciation. FIG. 3 is shown to demonstrate a dropdown list control 25 for switching languages. Any user control that receives focus and a user action (e.g., click or selection) may be used.

Figure 4:
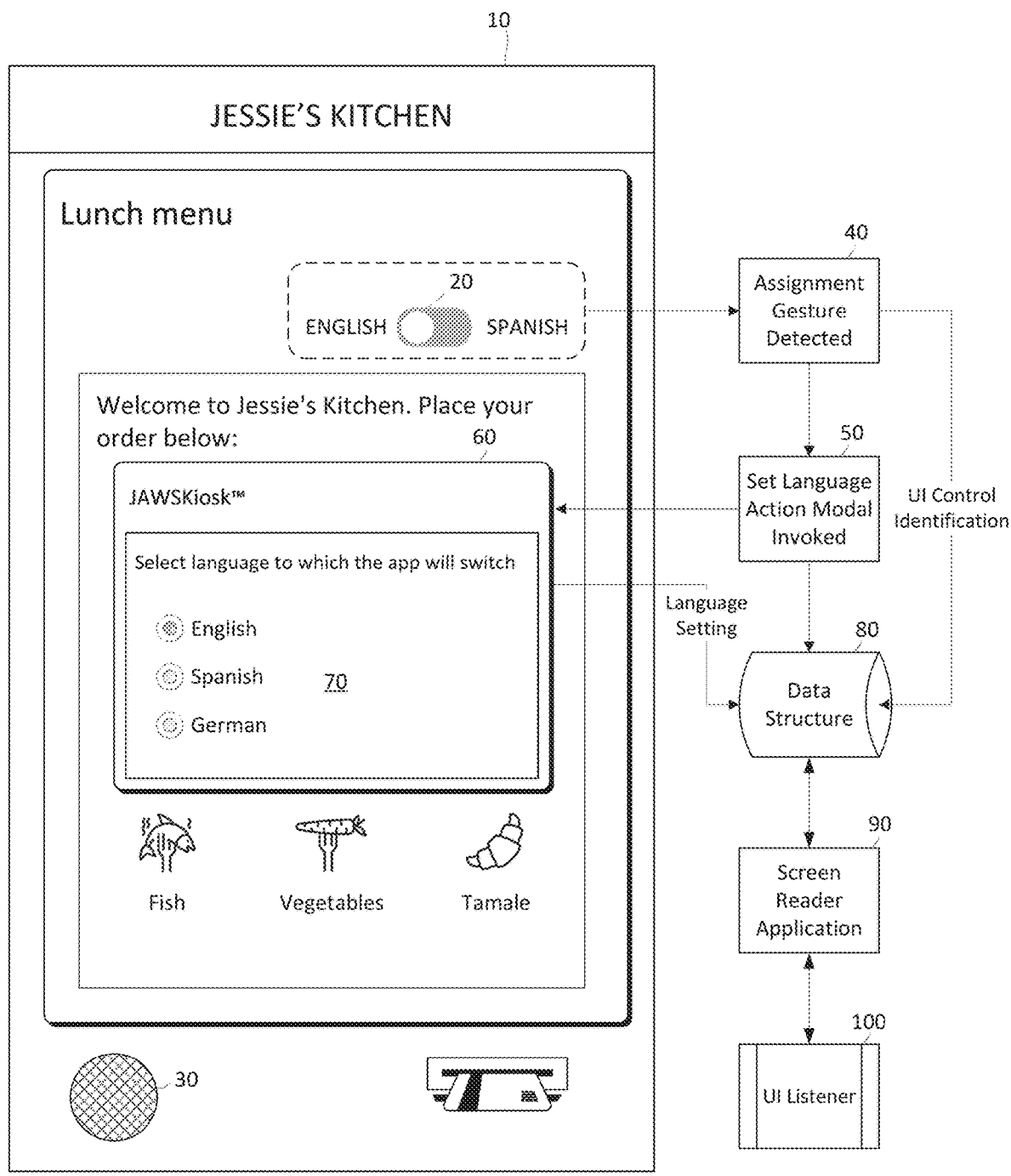
FIG. 4 shows an embodiment of the invention configuring the system to listen for a change in a toggle switch control to change the language of the screen reader.

FIG. 4 shows an implementation of the invention wherein toggle switch 20 is put in focus and an assignment gesture 40 for the toggle switch 20 is received by the screen reader application. Either directly or thorough other menu selections a set language action model dialog box event 50 is fired to display a language action dialog 60 on the GUI. An array 70 of selected languages are presented in dialog 60. The end user selects the appropriate language in control 70 to match the state of control 20. In this example, both are set to the English language. This language setting (English) is saved along with the identity of the control (toggle button 20) which can be later identified in a listener event callback to data structure 80. The data structure is communicatively coupled to screen reader application 90 and a user interface (UI) listener 100 to detect when the control is in focus and/or activated again.

Figure 5:
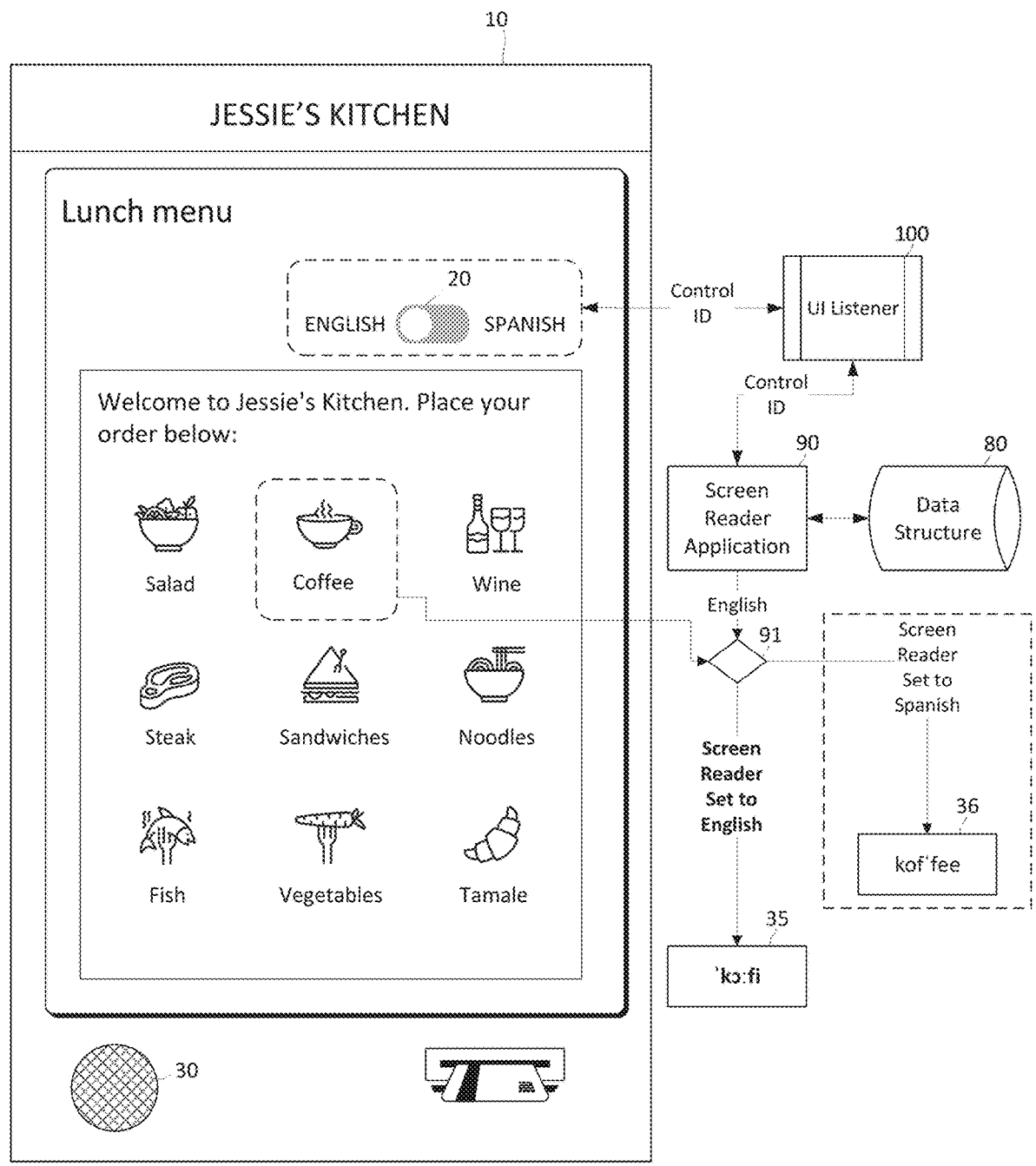
FIG. 5 shows an embodiment of the invention listening for a change in the toggle switch control moving from Spanish to English and then changing the screen reader active language from Spanish to English in response.

In FIG. 5, the end user switches from Spanish to English using toggle switch 20. This time, UI listener 100 detects the focus and selection of toggle switch 20 in an event callback. The control identity and value are passed through screen reader application 90 to data structure 80 to query if there is a match. In this case, toggle switch 20 is indeed the user control that switches languages in the GUI so the active language setting 91 for the screen reader application 90 changes from Spanish to English. Accordingly, if end user selects a menu item for "Coffee" it will be read aloud by screen reader application 90 with the correct pronunciation 35 in an English voice instead of the incorrect pronunciation 36 in a Spanish voice.

Figure 6:
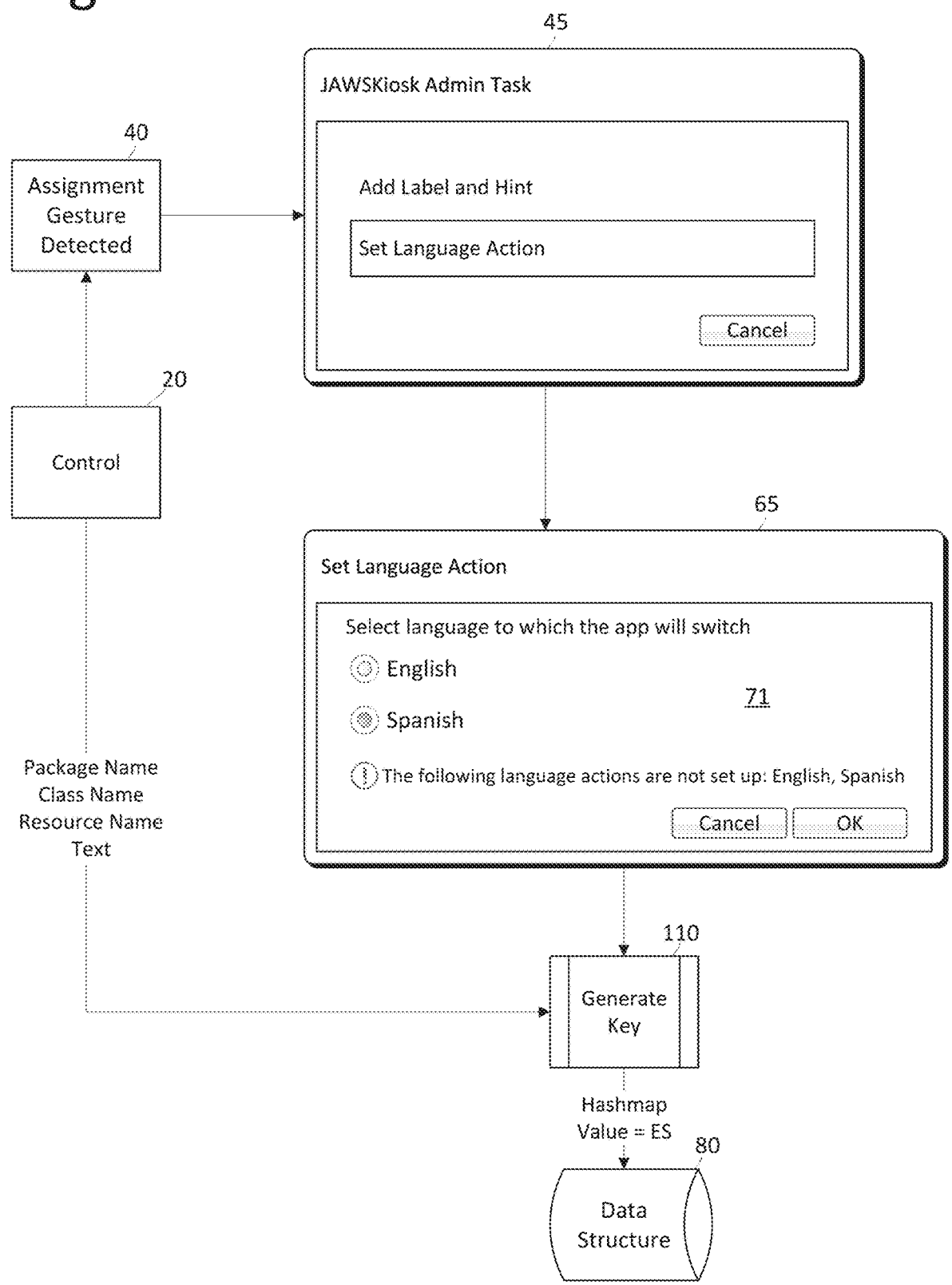
FIG. 6 show a combination of flowchart workflow and exemplary user interface dialogs for assigning a language action to a control in a user interface.

FIG. 6 shows a process of saving a language switch event, its value and its control identity. Control 20 is put in focus and an assignment event 40 is fired. This causes a modal dialog box 45 to show on the GUI giving two screen reader options for control 20. The top option can add a custom description or hint to control 20 so when it is put in focus again the end user hears a preferred description. The second option in modal dialog box 45 is to set the language action according to an embodiment of the present invention. This brings up second dialog box 65. Language selection control 71 lists the available languages in the screen reader and invites the end user to assign the screen reader voice/language that corresponds to the language set by control 20 on the GUI. A key is generated 110 that creates a hashmap representative of the control 20 setting (so it is identifiable later) along with the value the screen reader should be set to. For example, the key may be derived from the combination of package name, class name, resource name and text value of the control. This is saved to data structure 80 with a language identifier as the value.

Figure 7:
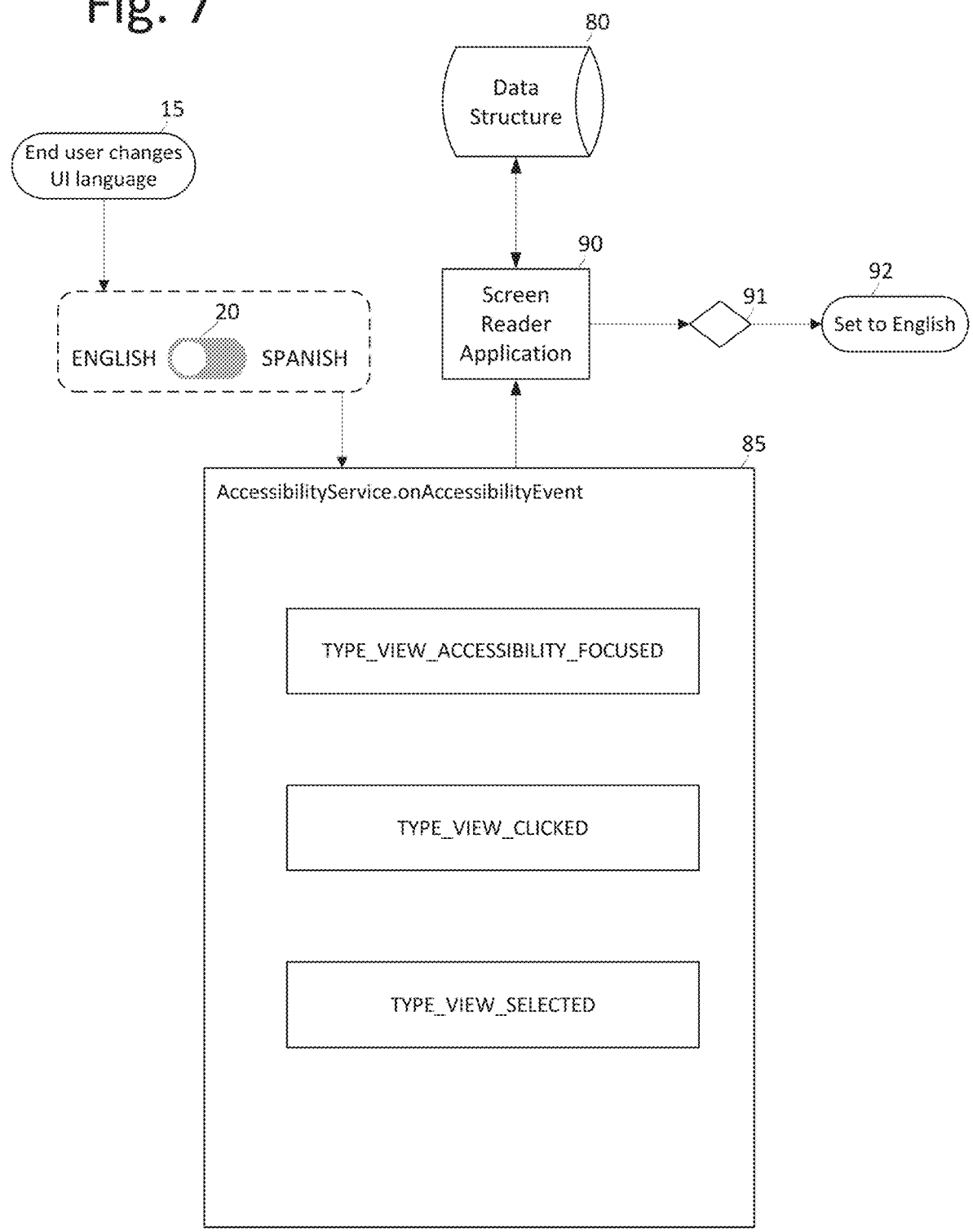
FIG. 7 shows a flowchart diagram of listening through an accessibility service for changes in a preidentified user interface control that switches the displayed language on a user interface and setting the screen reader output language to the same language.

FIG. 7 shows the invention in operation post-configuration. An end user changes the UI language 15 by toggling control 20. By monitoring an accessibility services on the operating system, events related to controls such as focus, click and selection create event callbacks that are detected by screen reader application 90. When the control and setting matches one previously configured and saved to data structure 80, the active screen reader language 91 is set to the appropriate value 92 matching that of control 20. Accordingly, spoken output from screen reader application 90 has the correct voice, inflection and pronunciation for the language selected by control 20.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Glossary of Claim Terms

Data Structure means a data store framework for saving, querying and returning data.

Event Handler or Listener means a callback subroutine that handles inputs received in a program.

Screen Reader means assistive technology for low vision or blind users that generates text and image content as Braille or speech (audible) output.

User Interface (UI) means a rendered display of controls, dialogs and information generated by a computing device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for setting a screen reader language localization, the method comprising the steps of:
   providing a configuration module adapted to monitor user action events indicated by messaging at an operating system level, the events executed on a third-party application user interface, the user interface containing a control that changes the language of displayed text in the user interface from a first localization to a second localization but does not localize the language setting of a default screen reader function on the operating system level whereby the language of the displayed text set to the second localization is otherwise audibly output by the default screen reader function with the wrong language pronunciation;
   responsive to a predefined user-implemented event on the user interface in conjunction with the control, the configuration module displays a context menu to set a language action to reconcile the default screen reader localization with the language of displayed text in the user interface;
   storing the language action in a data structure to map the language action to the control;

monitoring user control events on the user interface, the events selected from the group consisting of focus events, click events and selected events; and responsive to receiving a callback for the user control events, comparing the callback against the data structure and changing the default screen reader language responsive to the control changing the language of displayed text in the user interface whereby the language of the displayed text is audibly output by the default screen reader function with the correct language pronunciation.

2. The method of claim 1 wherein the monitoring of user control events on the user interface is implemented through an accessibility service.

3. The method of claim 2 wherein the callback is generated responsive to the firing of an accessibility event.

4. The method of claim 1 wherein the user interface is a kiosk.

5. The method of claim 1 wherein the data structure is a hashmap.

6. A method for setting an active screen reader language localization on an operating system, the method comprising the steps of:

providing a configuration module adapted to monitor end-user action events indicated by messaging at an operating system level, the events executed on a third-party application graphic user interface, the graphic user interface containing an end-user enabled control that changes the language of displayed text in the graphic user interface from a first localization to a second localization but does not localize the language setting of a default screen reader function on the operating system level whereby the language of the displayed text set to the second localization is otherwise audibly output by the default screen reader function with the wrong language pronunciation;

responsive to a predefined gesture implemented on the graphic user interface in conjunction with the control, the configuration module displays a context menu to set a language action to reconcile the active screen reader localization with the language of displayed text in the graphic user interface;

storing the language action in a data structure to map the language action to the control;

monitoring user control events on the graphic user interface through an accessibility service, the events selected from the group consisting of focus events, click events and selected events; and responsive to receiving a user control event, comparing the user control event against the data structure and changing the active screen reader language responsive to the control changing the language of displayed text in the graphic user interface whereby the displayed text read by the screen reader is audibly output with the inflection and pronunciation of the active screen reader language.

7. The method of claim 6 wherein the monitoring of user control events on the user interface is implemented through an accessibility service.

8. The method of claim 7 wherein the callback is generated responsive to the firing of an accessibility event.

9. The method of claim 6 wherein the user interface is a kiosk.

10. The method of claim 6 wherein the data structure is a hashmap.

11. A system for setting a screen reader application's localization, the system comprising:

the screen reader loadable into memory of an operating system running on a computing device, the operating system concurrently running a third-party application having a graphic user interface displaying text in a first language;

a configuration module in the screen reader that identifies a control on the application that switches text displayed on the graphic user interface from the first language to a second language;

a data store communicatively coupled to the configuration module storing both an identifier for the control and a value for the second language;

a listener module in the screen reader communicatively coupled to the application through the operating system, the listener module intercepting a plurality of events from the third-party application selected from the group consisting of focus events, click events and select events, the listener module receiving a collection of event data;

a query module in the screen reader comparing the collection of event data against the data store wherein responsive to the collection of event data matching the identifier for the control and the value for the second language, the screen reader sets its localization to the second language.

12. The system of claim 11 wherein the graphic user interface includes a touch screen interface.

13. The system of claim 12 wherein a predefined gesture operable on the control causes a context menu to display with controls to assign one of a plurality of languages to the control.

14. The system of claim 13 wherein the plurality of languages are enumerated in the context menu and correspond to the languages supported by the screen reader application.

15. The system of claim 11 wherein the configuration module that identified the control creates a key using a combination of a package name, class name, resource name and text of the control and stores the key in a hashmap with a language identifier as a corresponding value.

\* \* \* \* \*